United States Patent [19]

Oklejas et al.

[11] 3,999,377
[45] Dec. 28, 1976

[54] TESLA-TYPE TURBINE WITH ALTERNATING SPACES ON THE ROTOR OF COOLING AIR AND COMBUSTION GASES

[76] Inventors: Robert A. Oklejas; Eli Oklejas, Jr., both of 3311 Lakeview Drive, Monroe, Mich. 48161

[22] Filed: June 6, 1975

[21] Appl. No.: 584,361

Related U.S. Application Data

[63] Continuation-in-part of Ser. No. 433,672, Jan. 16, 1974, Pat. No. 3,899,875.

[52] U.S. Cl. .................. 60/39.51 R; 60/39.66; 60/39.75; 417/406
[51] Int. Cl.[2] ............. F02C 7/10; F02C 7/12; F04B 17/00
[58] Field of Search .......... 60/39.75, 39.66, 39.45, 60/39.51 R; 415/178, 58; 417/406, 350, 351

[56] References Cited

UNITED STATES PATENTS

| | | | |
|---|---|---|---|
| 2,647,685 | 8/1953 | Srogi | 416/186 |
| 2,988,266 | 6/1961 | Hughes | 417/406 |
| 3,007,311 | 11/1961 | Amero | 60/39.75 |

FOREIGN PATENTS OR APPLICATIONS

| | | | |
|---|---|---|---|
| 205,864 | 10/1959 | Austria | 416/186 |
| 599,519 | 10/1932 | Germany | 415/90 |

*Primary Examiner*—Carlton R. Croyle
*Assistant Examiner*—Thomas I. Ross
*Attorney, Agent, or Firm*—Richard D. Emch

[57] ABSTRACT

A Tesla-type turbine including turbine blade cooling means is disclosed. The turbine blades define a plurality of alternate spaces, with an air-conducting cooling space positioned between each pair of turbine or working spaces. While hot working gas expands between blades in the turbine spaces, cooling air flows in the opposite direction in the adjacent cooling spaces to cool the turbine blades. The disclosed turbine construction provides for axial air inflow and radial air outflow, with axial exhaust of working gas. After being heated by contact with the turbine blades, the cooling air is utilized in the combustion chamber of the turbine.

4 Claims, 6 Drawing Figures

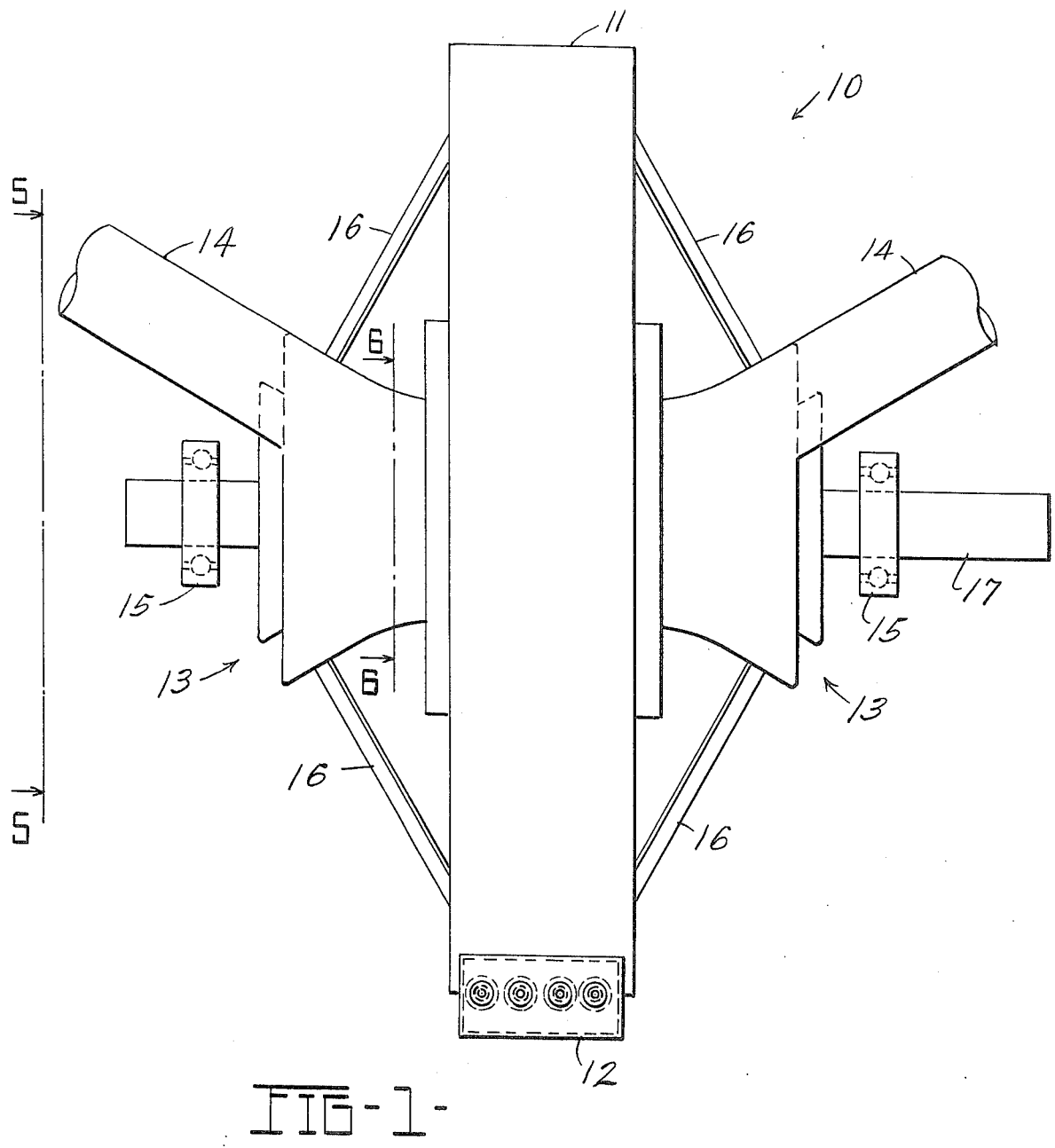
FIG-1-

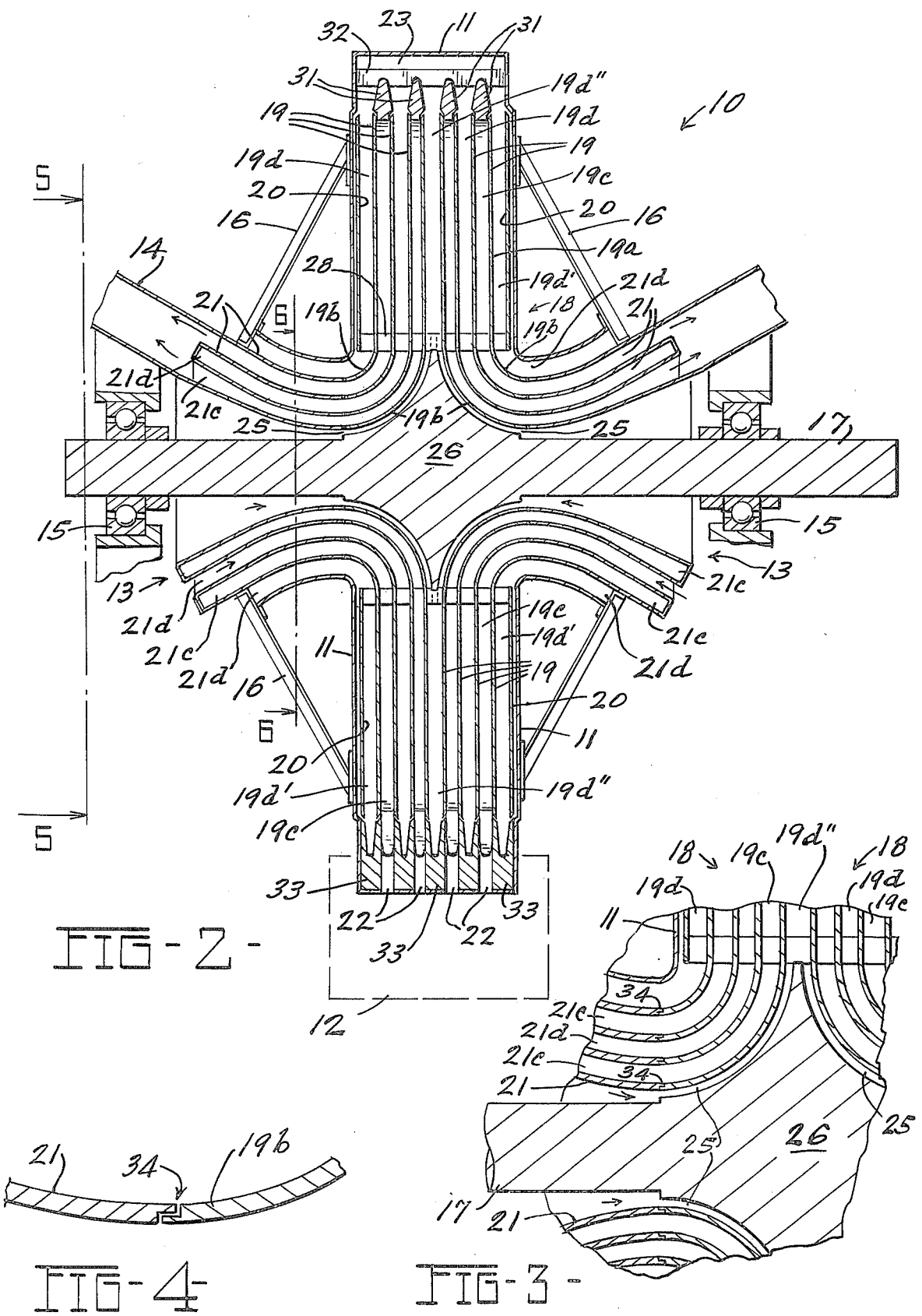

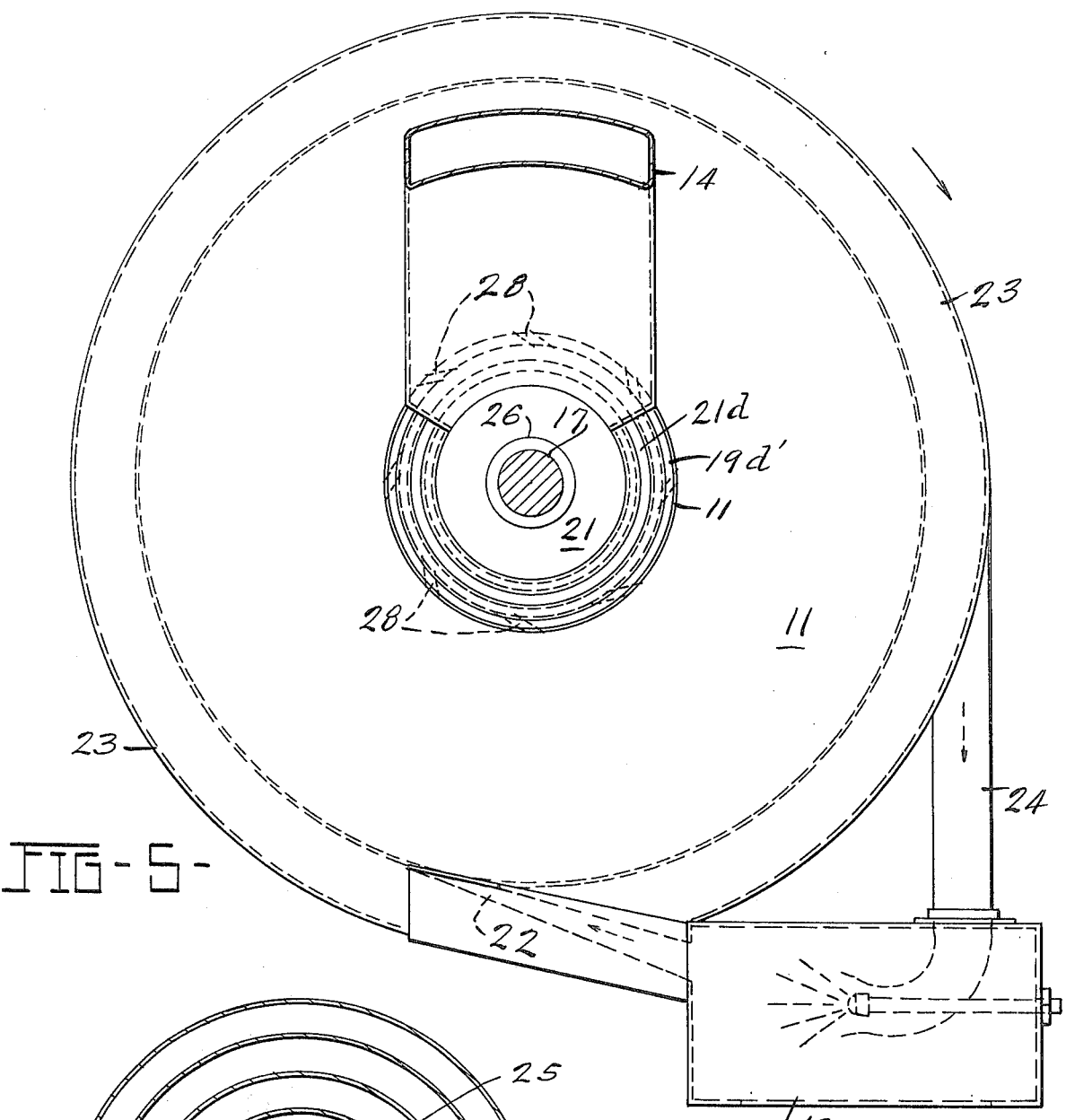
FIG-5-
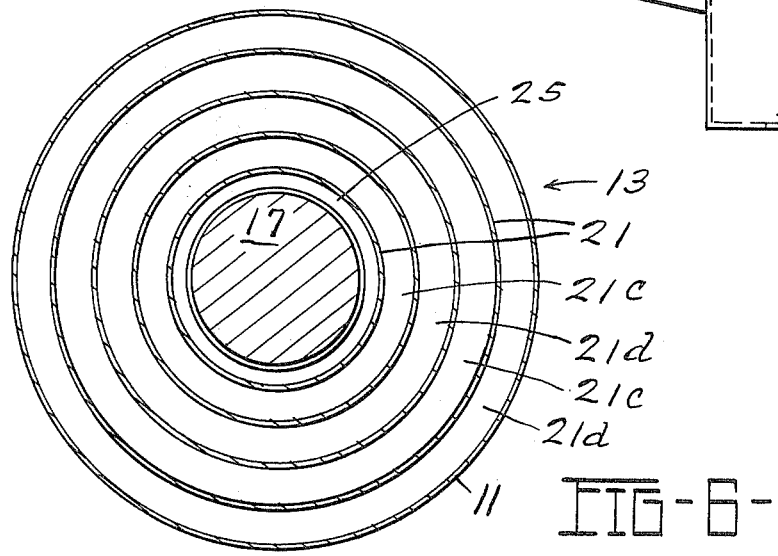
FIG-6-

3,999,377

TESLA-TYPE TURBINE WITH ALTERNATING SPACES ON THE ROTOR OF COOLING AIR AND COMBUSTION GASES

RELATED APPLICATION DATA

This is a continuation-in-part of our copending application Ser. No. 433,672, filed Jan. 16, 1974, now U.S. Pat. No. 3,899,875.

BACKGROUND OF THE INVENTION

The invention relates to gas turbines and more particularly to a Tesla-type spiral flow turbine having provision for turbine blade cooling and gas regeneration.

The basic Tesla turbine is described in Tesla U.S. Pat. No. 1,061,206. Combustion gases or other pressurized working fluids enter the turbine chamber through a nozzle directed generally tangentially to the outer periphery of a plurality of spaced apart flat disc-like turbine blades. The fluid travels in an inwardly spiralling path while effecting the rotation of the turbine blades, and is axially exhausted from openings defined in the blades close to the center of rotation. The efficiency of this type turbine lies in its elimination of sudden changes of the velocity and direction of movement of the fluid which generally occur with turbines having conventional vanes or blades.

Gas regenerators, i.e., means for utilizing the heat present in the exhaust gases on a turbine to heat intake air for combustion, are well known. The regenerators, however, are generally external to the turbine and merely effect a heat exchange between the gases finally exhausted from the turbine and intake air for combustion. See, for example, U.S. Pat. No. 2,784,552. While such a gas regeneration system does reclaim some heat energy from the exhaust gases, it does not utilize heat exchange in a Tesla-type turbine to the extent of the present invention described below.

SUMMARY OF THE INVENTION

A Tesla-type turbine similar to that to which the invention relates is shown and described in our copending related U.S. patent application Ser. No. 433,672, now U.S. Pat. No. 3,899,875. The apparatus of the present invention performs essentially the same functions as the regenerating turbine of the above application, utilizing the heat exchange in a Tesla-type turbine to increase nozzle output temperature, system output power, and system efficiency. The present turbine may or may not be used in connection with an external regenerator, but like the turbine construction of the above application, the present turbine apparatus includes a regeneration system among the turbine blades themselves. The system facilitates the attainment of very high intake air temperatures at the entrance to the combustion chamber while providing a means for cooling the turbine blades. The cooling of the outer peripheral area of the blades raises the maximum permissible working gas temperature at the nozzle by protecting the blades from adverse effects of high temperatures such as melting. With higher gas temperatures at the nozzles, greater power output and efficiency of the turbine is achieved. With the regenerator parameters properly designed and adjusted, cooling of the turbine blades can be accomplished without appreciable cooling of the working gas exiting the nozzles.

As in the apparatus disclosed in the above copending related patent application, the turbine blades of the present turbine define a plurality of alternate spaces, with a cooling space positioned between each pair of turbine or working spaces. The cooling spaces receive cooling air from the central region of a rotor of the turbine apparatus. From this area the air is driven outwardly by frictional engagement with the rotating blades, and is collected peripherally for admission of the now-heated air to a combustion chamber. In the combustion chamber the air is mixed with a fuel, combustion occurs, and expanding gases are delivered through tangentially disposed peripheral nozzles in the turbine spaces. The combustion gases perform work on the turbine blades and travel to the central region of the rotor adjacent but separated from where the cooling air enters.

In the central region of the rotor of the present invention, the turbine blades curve from their radial planar orientation into an axial orientation, with the blades toward one end of the rotor extending in one axial direction and the remaining blades extending in the opposite axial direction. This results in a series of concentric bell-shaped blade portions in the central region of the rotor. At the point where the blades at each end of the rotor extend substantially axially, the blades break along radial planes at each end of the rotor. Here the blades are met in pressure sealing engagement by complimentarily positioned stationary exhaust gas ducts and intake air ducts which extend generally axially and function as stationary extensions of the blades. There is a duct system at each end of the rotor. The gas ducts, which are in communication with the rotational turbine spaces, are closed at positions spaced axially from the break points, with the air intake ducts left open except at one position on the circumference of the stationary ducts where the exhaust spaces are opened into an exhaust trunk and those portions of the air ducts which fall within the trunk are closed. Two exhaust trunks are provided, one on each duct system, extending away from the rotor in opposite directions. The construction of the invention thus provides for axial air inflow and exhaust outflow, with tangential air outflow and working gas inflow, thereby providing maximum smoothness of air and gas flow and resulting in a highly efficient turbine. Also, the bell-shaped and axial portions of the blades serve to increase the working surface of the turbine over that of an ordinary Tesla turbine, resulting in greater efficiency for a given diameter.

DESCRIPTION OF THE DRAWINGS

FIG. 1 is a side elevational view of a turbine construction according to the invention;

FIG. 2 is a sectional elevation view of the turbine;

FIG. 3 is a detailed view showing a portion of the turbine construction illustrated in FIG. 2;

FIG. 4 is a detailed view showing a pressure seal utilized in connection with the turbine construction;

FIG. 5 is an end elevational view of the turbine, taken along the line 5—5 of FIG. 1 or 2; and FIG. 6 is an end sectional view of the turbine taken along the line 6—6 of FIG. 1 or 2.

DESCRIPTION OF THE PREFERRED EMBODIMENT

In the drawings, FIG. 1 shows an exterior side elevational view of a Tesla-type turbine 10 according to the invention. The turbine 10 includes a housing 11, a combustion chamber 12, exhaust and air intake ducts 13 on either side of the housing 11, exhaust trunks 14 leading from each set of ducts 13, struts 16 connecting the sets of ducts 13 with the housing 11, and a rotor shaft 17 supported by bearings 15. The housing 11 and other components connected thereto and visible in FIG. 1, as well as the exterior of the bearings 15, are of course stationary and may be suitably mounted to a floor, within a vehicle, etc. The shaft 17 rotates within the housing 11, being driven by expanding gases from the combustion chamber 12 as will be seen below.

FIG. 2 shows the turbine assembly 10 in section. As indicated therein, the turbine includes an internal rotor 18 connected to the shaft 17 and supporting a series of turbine blades 19 which comprise a part of the rotor. In the schematic representations of the drawings, a small number of blades 19 are shown; in practice, a much larger number may be provided. Each blade 19 is made up of a flat, disc-shaped outer portion 19a and an inner bell-shaped portion 19b which is positioned in registry with one of a number of stationary walls 21 of the exhaust and air intake ducts 13. As shown in FIGS. 2 and 3, the rotational bell-shaped turbine blade portions 19b are separated from the walls 21 of the ducts 13 along radial planes. Gas and air flow communication is established between the ducts 13 and spaces 19c and 19d between the turbine blades 19. FIG. 6 shows an axial sectional view of the rotor shaft 17 and the walls 21 of the exhaust and air intake ducts 13. As illustrated therein, the ducts 13 are ring-shaped and concentric with one another and with the shaft 17.

The spaces 19c are turbine or working gas spaces which receive a tangential flow of expanding working gas from nozzles 22 communicating with the combustion chamber 12. The gas spirals inwardly through the spaces 19c toward the center of the rotor 18. The nozzles 22 and the combustion chamber 12 are only schematically represented in FIG. 2. Alternating with the turbine spaces 19c are the spaces 19d through which cooling air passes in an outwardly spiralling path, being compressed somewhat en route. Thus the blades 19 defining the alternate turbine and cooling air spaces 19c and 19d form a counterflow heat exchanger or regenerator for reclaiming heat from the blades to raise the temperature of the air passing through the spaces 19d and to cool the blades 19. Having passed through the spaces 19d, the heated and compressed air is collected in a peripheral collection chamber 23 (see FIGS. 2 and 5) and delivered through a duct 24 into the combustion chamber 12 (FIG. 5). The air is then mixed with a fuel and burned in the combustion chamber 12, from which the resulting gases pass through the nozzles 22 where they expand and enter the turbine spaces 19c tangentially at a high velocity.

As discussed above, the turbine spaces 19c and air spaces 19d communicate with appropriate spaces between the walls 21 of the exhaust and air intake ducts 13. The turbine spaces 19c communicate with exhaust ducts 21c, while the air spaces 19d communicate with air intake ducts 21d. The typical situation is seen in the lower half of FIG. 2, where the air intake ducts 21d are open to the atmosphere and the turbine spaces 21c are closed. Cooling air entering the ducts 21d may be at atmospheric pressure, as shown, or may be first compressed by a compressor (not shown) connected to the ducts 21d. This construction varies only where the exhaust trunks 14 occur, as shown in the upper half of FIG. 2. The exhaust trunks 14 extend from the duct assembly as shown, with the exhaust ducts 21c open inside the trunks and the air intake ducts closed.

On each side of the turbine 10 adjacent the housing 11 are special air cooling spaces 19d'. These spaces are in open communication with the atmosphere as shown, and are formed between the last turbine blade 19 on each side of the assembly and a rotating disc 20 adjacent the stationary housing 11.

A central air cooling space 19d'' also presents a special situation in the preferred embodiment of the turbine 10. The central space 19d'' receives cooling air from both sides of the turbine 10 through passageways 25 between a central core 26 of the rotor 18 and the innermost turbine blades 19b.

The turbine blades 19 are connected together by braces 28 connected to each blade 19 and to the core 26 of the rotor 18 by welding, for example. As shown in FIG. 5, the braces 28 are provided at numerous locations around the rotor 18 and may be angled to approximately line up with the spiral inflow of exhaust gases and spiral outflow of cooling air.

FIG. 2 shows various pressure seals utilized to contain cooling air and working gas and to separate them from one another. At the periphery of the turbine blades 19, circumferential pressure sealing rings 31 extend nearly continuously around the blades, being interrupted only at the position of the nozzles 22. The sealing rings 31 may be retained in position adjacent to the outer edges of the blades 19 by structural members 32 connected to the housing 11 at various locations around its periphery. As indicated in FIG. 2, the sealing rings 31 close the turbine spaces 19c, except at the nozzles 22, so that expanding working gas tangentially entering the turbine spaces 19c from the nozzles will be directed inwardly toward the center of the rotor 18. The seals illustrated are conventional pressure seals well known in the engine art.

Separate pressure sealing blocks 33 are employed at the location of the nozzles 22. These sealing blocks provide a seal which closes off the air spaces 19d, 19d' and 19d'' at the nozzle location, so that the nozzles can direct expanding working gas between sealing blocks into the turbine spaces 19c. All of the nozzle sealing blocks 33 are structurally connected to the combustion chamber 12, which is indicated schematically in FIGS. 2 and 5.

Another type pressure seal is employed where the inner, bell-shaped turbine blade portion 19b meet the stationary duct walls 21. Like the seals employed at the periphery of the blades 19, these pressure seals 34, illustrated in FIG. 4, are designed to restrain the passage of all but small quantities of gases without contact between the two opposed surfaces which in this case are the inner turbine blade portions 19b and the duct walls 21.

It should be understood that the turbine 10 illustrated and described above may be operated in connection with an external regenerator (not shown). Such a regenerator would comprise a heat exchanger preferably of the counterflow type which might receive exhaust gas from the trunks 14 for heat exchange with compressed air entering the regenerator from the opposite direction. The air thus heated would then be admitted to the intake air ducts 21d described above. Of course, an intake air trunk similar to the exhaust trunk 14 would be necessitated for the proper direction of heated air into the intake air ducts 21d. Alternatively, an external regenerator could be connected as shown and described in our copending application Ser. No. 433,672, whereby air which has been passed through and compressed in the cooling air spaces 19d and collected in the collection chamber 23 would then be directed into the external regenerator (not shown). The air could be further compressed before entering the external regenerator by a compressor (not shown) located between the collection chamber 23 and the external regenerator or located upstream of the intake air ducts 21d. From the external regenerator, the further heated air would then be admitted to the combustion chamber. Where such an external regenerator is positioned depends upon temperatures and pressures under which the turbine is operated. Significantly, the construction described above provides some initial regeneration without the use of a separate external regenerator. Atmospheric air entering the air intake ducts 21d picks up heat from the walls 21 of the adjacent exhaust gas ducts 21c, and this heat exchange is aided by the swirling of the incoming air as it approaches the rotating turbine blades. Thus, the air is somewhat heated before it enters the interblade cooling spaces 19d.

In addition to providing for blade cooling and gas regeneration, the Tesla-type turbine of the invention further increases efficiency by providing for smooth exiting gas flow and entering air flow without abrupt high-speed changes of flow direction. Various other embodiments and alterations to the preferred embodiment will be apparent to those skilled in the art and may be made without departing from the spirit and scope of the following claims.

We claim:

1. A gas turbine, comprising:
   a housing;
   a rotatable shaft within said housing;
   a plurality of turbine blades within said housing and concentrically disposed in spaced relation upon said shaft, defining a plurality of interblade spaces circumjacent said shaft, every second space defining a turbine space, remaining spaces defining air cooling spaces alternating with said turbine spaces, said turbine blades each including an outer flat, radially disposed disc-like portion and an inner curved, bell-shaped portion terminating in a generally axially oriented end such that said interblade spaces terminate generally axially;
   at least one combustion gas nozzle disposed at the periphery of each turbine space substantially tangentially thereto;
   sealing means on said housing in circumferential relationship to said blades for peripherally closing each turbine space from nozzle to nozzle and for isolating the flow of working fluid from each nozzle into the turbine space;
   a combustion chamber connected to said nozzles; and
   a collection chamber defined by said housing about the periphery of said air cooling spaces leading ultimately to an air inlet of said combustion chamber.

2. The turbine of claim 1, further including exhaust ducting means in pressure-sealing engagement with the axial ends of said turbine spaces.

3. The turbine of claim 2, further including intake air ducting means connected to a source of cooling air and in pressure-sealing engagement with the axial ends of said air cooling spaces.

4. A turbine comprising a housing and a rotor within said housing, said rotor comprising a central rotatable shaft and blades connected to said shaft, said blades defining first and second pluralities of spaces therebetween for alternately receiving a low temperature cooling fluid in said first plurality of spaces and a high temperature working fluid in said second plurality of spaces, means on said housing for isolatingly delivering the working fluid peripherally into said second plurality of spaces comprising nozzles on said housing for introducing working fluid into said second spaces and circumferential sealing means on said housing adjacent opposing blades which define each space of said second plurality of spaces for peripherally closing said spaces and isolating said spaces from said adjacent alternate first spaces, said sealing means being contiguous around each turbine space periphery except at openings defined for the nozzles, means associated with said rotor for exhausting the working fluid, means associated with said rotor for isolatingly delivering the cooling fluid generally centrally to said first plurality of spaces, and means on said housing for peripherally collecting the cooling fluid, whereby each blade receiving the working fluid across one side thereof correspondly receives the cooling fluid across an opposite side thereof, and wherein said cooling fluid delivering means comprises a plurality of ring-shaped cooling fluid ducts positioned in pressure-sealing engagement with bell-shaped portions of adjacent blades defining said first plurality of spaces, said cooling fluid ducts being connected to a source of cooling fluid, and said exhausting means comprises a plurality of ring-shaped exhaust ducts in alternating concentric relationship with cooling fluid ducts and positioned in pressure-sealing engagement with bell-shaped portions of adjacent blades defining said second plurality of spaces.

* * * * *